(12) United States Patent
Chen et al.

(10) Patent No.: US 8,976,118 B2
(45) Date of Patent: Mar. 10, 2015

(54) METHOD FOR CHARACTER CORRECTION

(75) Inventors: Lei Chen, Beijing (CN); Jenny S. Li, Danbury, CT (US); Wen Hao Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 13/355,244

(22) Filed: Jan. 20, 2012

(65) Prior Publication Data
US 2013/0191110 A1    Jul. 25, 2013

(51) Int. Cl.
G06F 3/00    (2006.01)

(52) U.S. Cl.
USPC ............... 345/171; 704/8; 715/262; 715/271

(58) Field of Classification Search
USPC ................. 715/262, 271; 704/8; 345/171
See application file for complete search history.

(56) References Cited

U.S. PATENT DOCUMENTS

| 6,587,819 | B1 | 7/2003 | Lu |
| 7,013,258 | B1 | 3/2006 | Su et al. |
| 7,478,033 | B2 | 1/2009 | Wu et al. |
| 2005/0248546 | A1* | 11/2005 | Kong ............................ 345/173 |
| 2005/0289463 | A1 | 12/2005 | Wu |
| 2006/0095843 | A1* | 5/2006 | Chou ............................ 715/535 |
| 2006/0256088 | A1* | 11/2006 | Kong ............................ 345/168 |
| 2008/0027904 | A1 | 1/2008 | Hill et al. |
| 2008/0028303 | A1 | 1/2008 | Wu |
| 2013/0257741 | A1* | 10/2013 | Kong ............................ 345/172 |

FOREIGN PATENT DOCUMENTS

| CN | 101206673 A | 6/2008 |
| JP | 04225415 A | 8/1992 |
| JP | 2001175645 A | 6/2001 |

OTHER PUBLICATIONS

Ben Ye, "A Roman-Chinese Character Conversion System Correcting Pinyin Spell Error with Application to the Chinese FEP"; IEIC Trans, INF & Syst, vol. E83-D, No. 5, May 2000; 7 pages.
Chen Zheng et al., "Spelling Correction in Pinyin Input"; Chinese J. Computers, vol. 24, No. 7, Jul. 2001; 6 pages.

* cited by examiner

*Primary Examiner* — Daniel D Abebe
(74) *Attorney, Agent, or Firm* — Cantor Colburn LLP; Margaret McNamara

(57) ABSTRACT

A computer program product is provided and includes a non-transitory tangible storage medium readable by a processing circuit and on which instructions are stored for execution by the processing circuit for performing a method. The method includes enabling retrieval of a keyboard pressed sequence of characters of a first type, permitting a re-selection of characters of a second type, which are associated with the keyboard pressed sequence of the characters of the first type and permitting modification of the keyboard pressed sequence of the characters of the first type to initiate a search for and retrieval of characters of the second type.

20 Claims, 6 Drawing Sheets

---

300

PINYIN INPUT SEQUENCE
301

USER'S SELECTION OF CHINESE CHARACTERS
302

GENERATED CHINESE CHARACTER OUTPUTS
303

METHOD FOR CHARACTER CORRECTION

BACKGROUND

The present invention relates to a method for character correction and, more particularly, to a method for lightweight Chinese character correction with pinyin input.

It is often difficult to make corrections to a document when typing Chinese characters. Currently, users are permitted to make corrections and modifications only if they have not yet hit the enter key after typing a consecutive number of pinyin letters. For purposes of this disclosure, pinyin refers to a system to transcribe Chinese characters into the Roman alphabet and is used to spell Chinese names in foreign publications and as an input method to enter Chinese characters into computers.

When inputting Chinese phrases, prior to sending Chinese characters/sentences to an editor program (by hitting the enter key, or hitting the white space key, etc), users can modify input content and make selections to correct text. However, once users hit the enter key, the pinyin letters are converted into corresponding Chinese characters and, at this point, the Chinese characters are saved and editors generally prohibit users to make further modifications. If a mistake has been made, however, existing correction methods require users to delete the wrong text inside the editor and re-input them from the scratch using the input method. This requires repeated operations until the user arrives at the right text. Thus, for users who get used to typing long pinyin phrases or sentences before sending Chinese characters/sentences to the editor (by hitting the enter key, or hitting the white space key, etc), the impact of typographical mistakes (typos) can be significant since even one typo of pinyin lettering can negatively affect the Chinese character translation after the users hit the enter key.

Another problem using the current pinyin input methods is that multiple possible Chinese characters can be mapped to the same pinyin letters. This is due to the fact that the same pinyin letters can generate four possible tones or sounds and each tone can map to different Chinese characters that ultimately have different meanings. A typo on the pinyin characters or correct pinyin characters but with a wrong selection of tone will generate a wrong Chinese character as a result.

SUMMARY

According to one embodiment of the present invention, a computer program product is provided and includes a non-transitory tangible storage medium readable by a processing circuit and on which instructions are stored for execution by the processing circuit for performing a method. The method includes enabling retrieval of a keyboard pressed sequence of characters of a first type, permitting a re-selection of characters of a second type, which are associated with the keyboard pressed sequence of the characters of the first type and permitting modification of the keyboard pressed sequence of the characters of the first type to initiate a search for and retrieval of characters of the second type.

A system is also provided and includes a processing circuit configured to perform a method. The method includes enabling retrieval of a keyboard pressed sequence of characters of a first type, permitting a re-selection of characters of a second type, which are associated with the keyboard pressed sequence of the characters of the first type and permitting modification of the keyboard pressed sequence of the characters of the first type to initiate a search for and retrieval of characters of the second type.

A method for character correction for a program presenting an editor window displaying a sequence of characters of a first type is also provided. The method includes opening an input window of a computing device in response to a command with respect to a questionable character of the first type in the sequence, displaying in the input window a character of a second type, which is associated with the questionable character, and various selections for the user, each including characters of the first type, which are respective candidate characters for association with the character of the second type and, upon a selection of one of the various selections, closing the input window and displaying the sequence of the characters of the first type in the editor window with the questionable character replaced by the candidate characters corresponding to the selection.

A method for character correction for a program presenting an editor window displaying a sequence of characters of a first type is also provided. The method includes opening an input window of a computing device in response to a command with respect to a questionable character of the first type in the sequence, displaying in the input window a character of a second type, which is associated with the questionable character, and various selections for the user, each including characters of the first type, which are respective candidate characters for association with the character of the second type, permitting the user to modify the character of the second type and updating the various selections in accordance with modifications made to the character of the second type.

A method for character correction for a program presenting an editor window displaying a sequence of characters of a first type is also provided. The method includes opening an input window of a computing device in response to a command with respect to a questionable character of the first type in the sequence, displaying in the input window a modifiable character of a second type, which is associated with the questionable character, and various selections for the user, each including characters of the first type, which are respective candidate characters for association with the modifiable character of the second type and each being updateable in accordance with modifications of the modifiable character of the second type and upon a selection of one of the various selections, closing the input window and displaying the sequence of the characters of the first type in the editor window with the questionable character replaced by the candidate characters corresponding to the selection.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with aspects of the invention, users are enabled to retrieve a keyboard pressed sequence and to modify that sequence so as to input the correct text they want. At least two kinds of mechanisms are supported to this end: one permits a user to re-select correct Chinese characters from an input window and another permits a user to modify the original keyboard pressed sequence directly to get the correct Chinese characters after they are retrieved. More particularly, the present invention is a computer program product that enables retrieval of a keyboard pressed sequence of characters of a first type, permits a re-selection of characters of a second type, which are associated with the keyboard pressed sequence of the characters of the first type and permits modification of the keyboard pressed sequence of the characters of the first type to initiate a search for and retrieval of characters of the second type.

Figure 1:
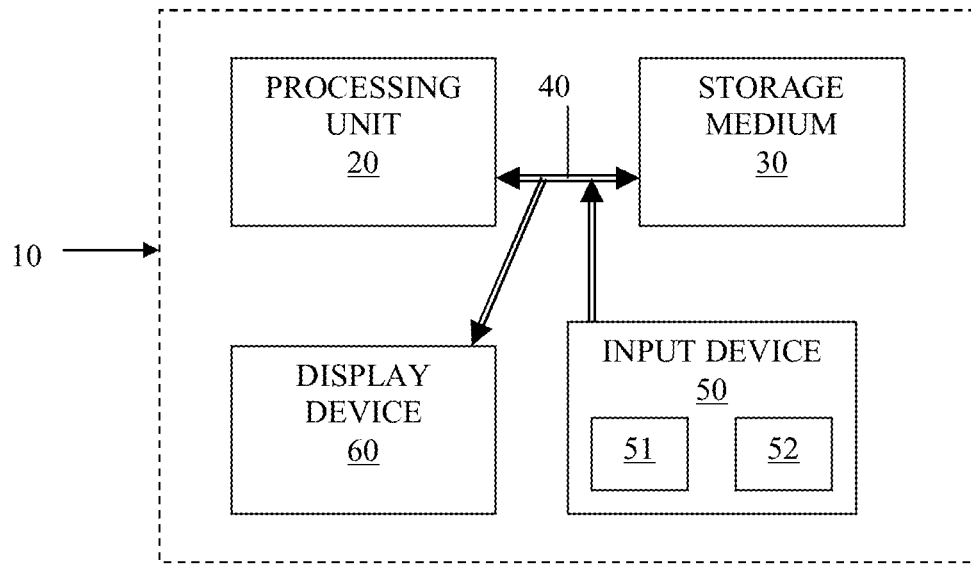
FIG. 1 is a schematic illustration of a computing system.

With reference to FIG. 1, a computing system 10 is illustrated and includes a processing circuit 20, a computer or machine readable non-transitory tangible storage medium ("storage medium") 30 and a bus 40 by which the processing circuit 20 and the storage medium 30 are coupled. The storage medium 30 may include various types of read only and read/write memory units on which executable instructions are stored. These executable instructions, when executed, are configured to cause the processing circuit 20 to execute the methods and programs described herein. The computing system 10 further includes a user input device 50, such as a mouse 51 and a keyboard 52, by which a user can input various commands and text, and a display unit 60, such as a monitor on which the processing circuit 20 displays various graphical user interfaces as instructed by the executable instructions. In accordance with embodiments, the computing system 10 may be configured and programmed to run various types of applications, such as a word processing applications stored in the storage medium 30. These word processing applications may include a pinyin editor program as described herein.

Figure 2:
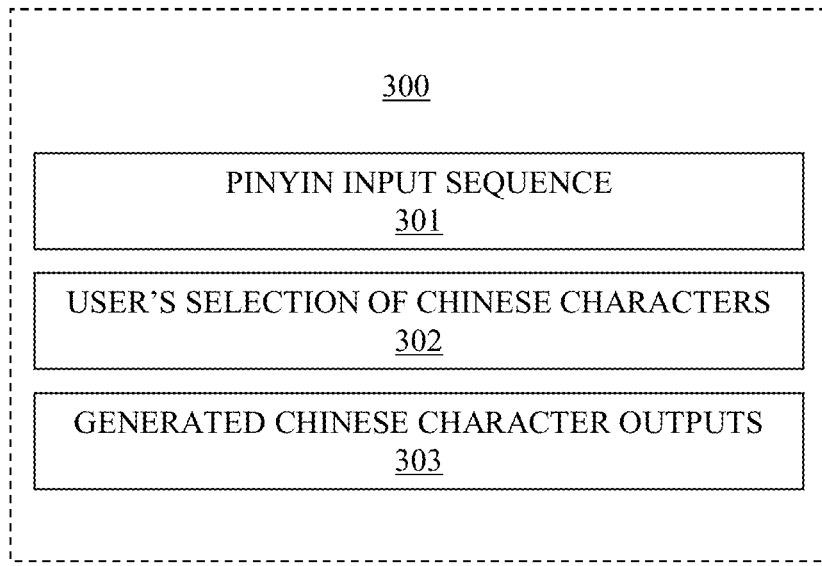
FIG. 2 is a schematic illustration of an Input Information Object (IIO) in accordance with embodiments.

With reference to FIG. 2, when the user of the computing system 10 runs the word processing applications with the pinyin editor program (hereinafter referred to as the "program") and enters pinyin letters in a keyboard pressed sequence, the program generates an internal list of Input Information Objects (IIO) 300 and establishes the internal list in the storage medium 30 to track the user's input, the user's selections and to track the generated output characters. As shown in FIG. 2, each IIO 300 includes a pinyin input sequence 301 that is input by the user via the program, the user's selection of Chinese characters 302 and generated Chinese character outputs 303, which will be output into the pinyin editor program.

In accordance with embodiments, a structural example of an IIO 300 implemented in C language is as follows:

```
typedef struct InputRecord {
    const char *keyboard_input;
    const char *phrase_select_input;
    const char *output_str;
}InputRecord;
```

Each time the editor is run, a list for the IIOs 300 is initialized and monitoring of the user's special keyboard input combinations is conducted (this can be customized by the user). Each time the user inputs one pinyin sequence, one IIO 300 is added to the end of the list. The combination of the user's pinyin sequence and his selection of Chinese characters will be saved in accordance with the user's preferences so that the user can be prompted with related candidate words next time a same or similar pinyin sequence is entered.

For the correction of typos, when the user realizes he has inputted incorrect pinyin sequences or made incorrect selections of the Chinese characters for the correct pinyin sequences, he can highlight the incorrect characters that have been input or displayed in an editor window (see FIGS. 4-21) and press a predefined keyboard input combination to indicate that he would like to make a correction. The program then searches for the highlighted characters in all the IIOs 300. If the selection is found in one of the stored IIOs 300 (i.e., in the output_str of one of the IIOs 300), the program displays its input window (see FIGS. 4-21) with the user's last selection. To make the correction, the user can easily re-edit the pinyin sequence or the Chinese characters/words as desired. If more than two IIOs 300 are found to match successfully, the newly added IIO 300 may be used by the program by default. The user can either enter the new pinyin sequence for the typo and re-select the Chinese characters, or use the existing pinyin sequence (if it is correct) and re-select the Chinese characters. Once the user has made the correction, the IIOs 300 of the original phrase will be updated with new combination selections of the pinyin sequence and the Chinese character selections.

To replace multiple incidents of typos, the user can have the option to fix either one copy of the typos or multiple copies of the typos. Multiple copies of the same typo would imply that the same pinyin sequence and the Chinese characters selection are the same. When the user decides to replace multiple copies of the same typo, all the IIOs 300 that match the typo will be affected. Once the user corrects one instance of the typo, the stored IIOs 300 of the rest of the typos will be replaced with the correction. Alternatively, there could be cases that the user has entered the same pinyin sequence in multiple places of the document, but the user selected different Chinese characters for the same pinyin sequence. In these cases, the program also enables the user to replace all the pinyin sequences with the same selection of Chinese characters.

Figure 3:
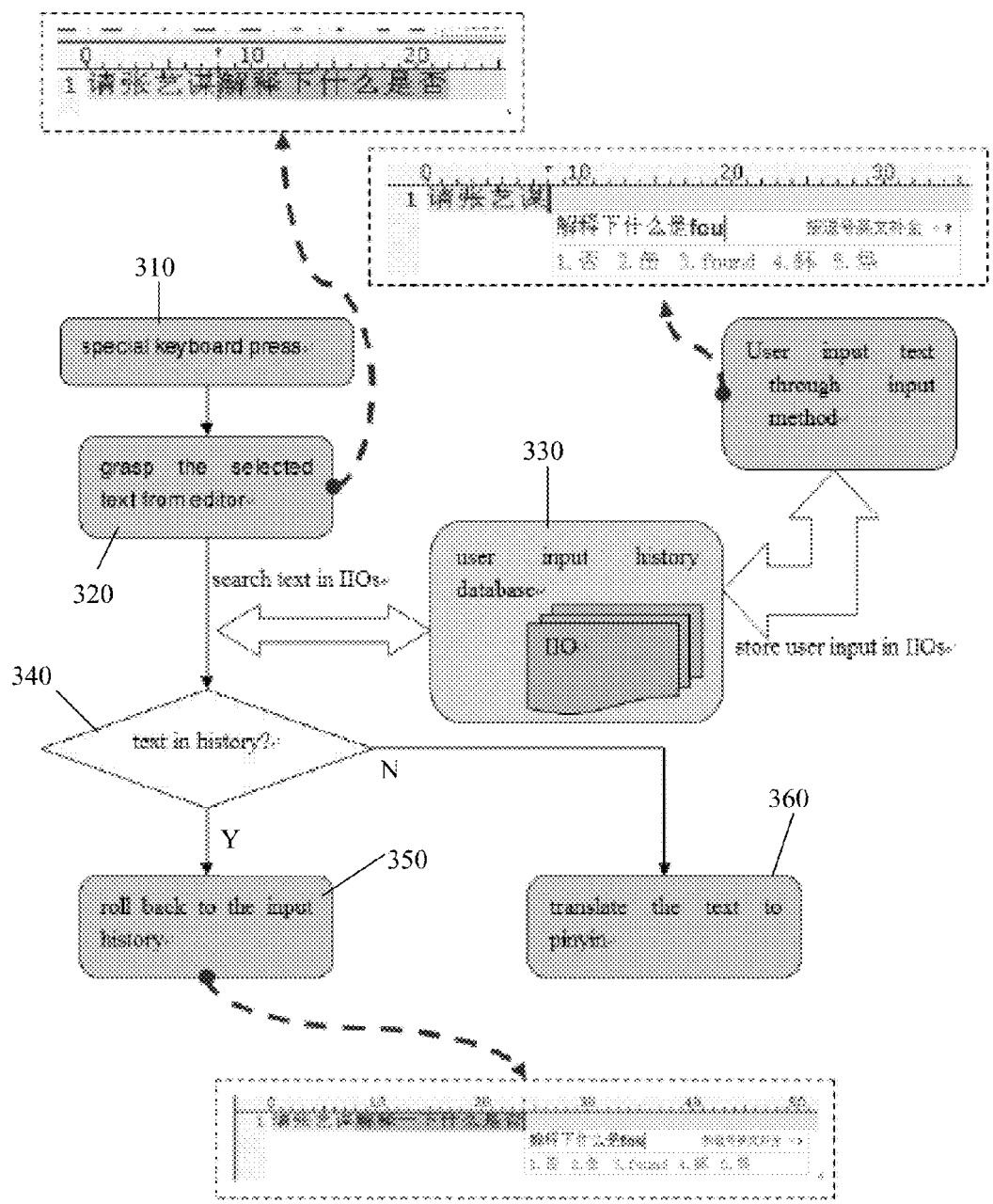
FIG. 3 is a flow diagram illustrating an operation of a computer program product for executing a method for character correction.

With reference to FIG. 3, a user initiates the computer program product and generates a keyboard press sequence of characters of a first type that are entered into an editor window as mapped characters of a second type. The user then notices that a change needs to be made and inputs a predefined special keyboard press sequence and command at operation 310 and grasps or highlights selected text in the characters of the second type I the editor window at operation 320. At this point, the program automatically searches for the keyboard press sequence of the characters of the first type in the IIOs 300, which are each stored in the storage medium 30 as a user input history database 330. At operation 340, it is determined whether the keyboard press sequence of the characters of the first type is stored in one or more of the IIOs 300. In an event the keyboard press sequence of characters of the first type is stored, the program rolls back to the input history at operation 350 for the keyboard press sequence of the characters of the first type and displays it in an input window whereby the user can conduct an analysis and determine if a modification is required or if re-selection of candidate characters of the second type needs to be made. In an event the keyboard press sequence of characters of the first type is not stored, the text is mapped/translated into candidate characters of the second type at operation 360.

Figure 4:
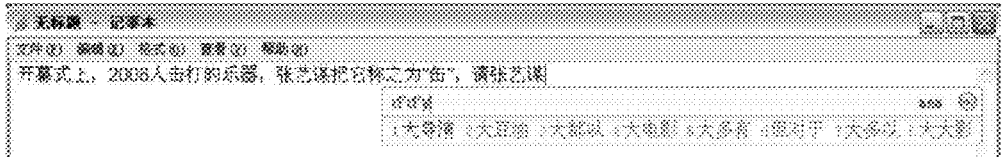
FIG. 4 illustrates a portion of an exemplary operation of the program to correct a short phrase in which the pinyin sequence is entered and a selection of possible Chinese characters are mapped and offered as choices to the user.
Figure 5:
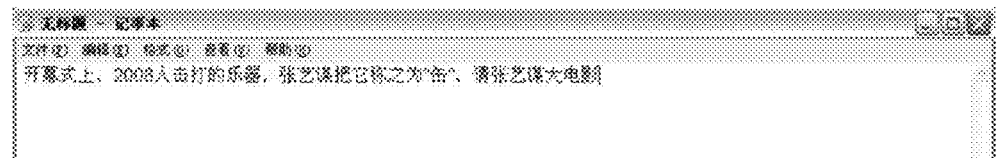
FIG. 5 illustrates a portion of an exemplary operation of the program to correct a short phrase in which the pinyin sequence is correct but the selection of the Chinese characters is incorrect.

With reference to FIGS. 4-8, an exemplary operation of the program to correct a short phrase in which the pinyin sequence is correct but the selection of the Chinese characters is incorrect is illustrated. In this example, "Ctrl+F10" is set as the special key combination and the user wants to input the Chinese text associated with choice #1, which is offered along with choices #1-#8 of candidate characters in the input window upon the keyboard input sequence 'ddy' being pressed as shown in FIG. 4. The mistake occurs when the user presses #4 such that the text associated with choice #4 is entered and the input window disappears. At this point, one IIO 300 is added to the list with the following attribute values:

*keyboard_input='ddy';
*output_str=the Chinese text associated with choice #4, and the Chinese text is generated with the text associated with choice #4 in the editor window, which is incorrect, as shown in FIG. 5.

Figure 6:
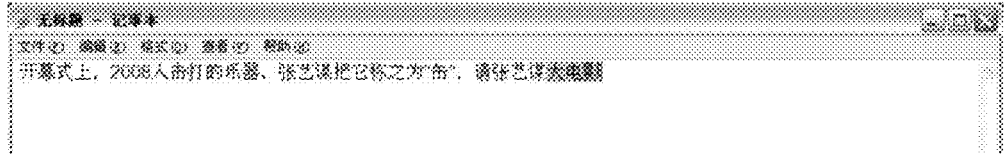
FIG. 6 illustrates a portion of an exemplary operation of the program to correct a short phrase in which the pinyin sequence is correct but the selection of the Chinese characters is incorrect, and the user highlights the wrong Chinese characters.
Figure 7:
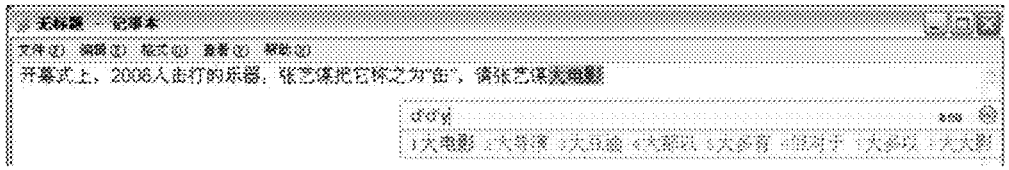
FIG. 7 illustrates a portion of an exemplary operation of the program to correct a short phrase in which the pinyin sequence is correct but the selection of the Chinese characters is incorrect where the input pinyin sequence and the possible selection of Chinese characters are retrieved.
Figure 8:
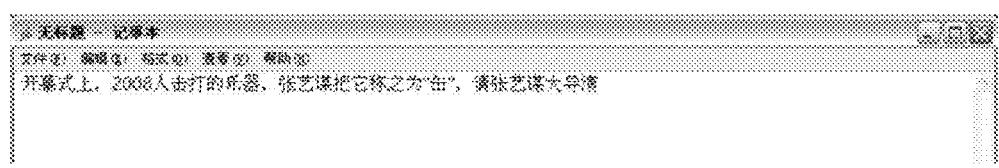
FIG. 8 illustrates a portion of an exemplary operation of the program to correct a short phrase in which the pinyin sequence is correct but the selection of the Chinese characters is incorrect and a correct set of Chinese characters are mapped when the user picked the right selection of Chinese characters.

In order to modify that incorrect text, the user needs to highlight the text in the editor window, as shown in FIG. 6, and press "Ctrl+F10". The program then responds by checking the IIO 300 list and finds that the stored IIO 300 has an *output_str value of the text associated with choice #4, which was highlighted previously. The input window thus reappears with a *keyboard_input value of 'ddy', as shown in FIG. 7, and the user then can quickly re-select the correct choice (i.e., choice #2). Once this selection is made, the input window disappears and the correct text is included in the editor window, as shown in FIG. 8.

Figure 9:
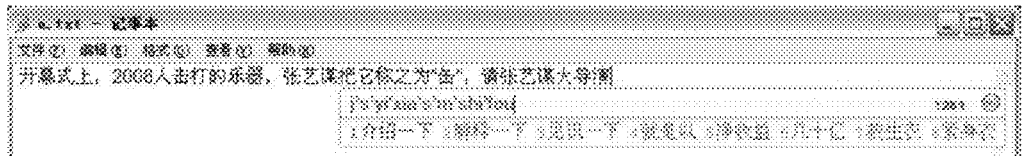
FIG. 9 illustrates a portion of an exemplary operation of the program to correct a long phrase in which the user continues to enter pinyin sequence as he continues with the rest of the sentence.
Figure 10:
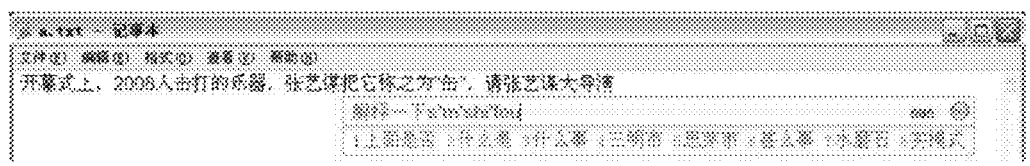
FIG. 10 illustrates a portion of an exemplary operation of the program to correct a long phrase in which a portion of the input pinyin sequence is mapped with possible Chinese characters that are displayed as selections for the user.
Figure 11:
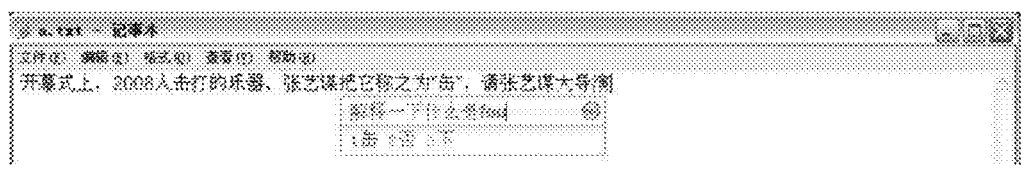
FIG. 11 illustrates a portion of an exemplary operation of the program to correct a long phrase in which the pinyin sequence is correct and the user has selected the correct Chinese characters that mapped to the earlier portion of the input pinyin sequence.
Figure 12:
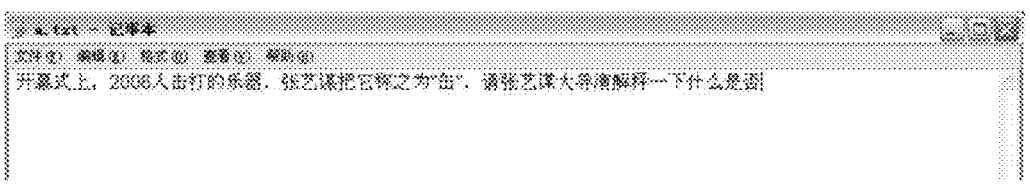
FIG. 12 illustrates a portion of an exemplary operation of the program to correct a long phrase in which the pinyin sequence is correct and the user has made a correct selection of the mapped Chinese characters to the middle portion of the input pinyin sequence where the possible Chinese characters for the last portion of the pinyin sequence are displayed.
Figure 13:
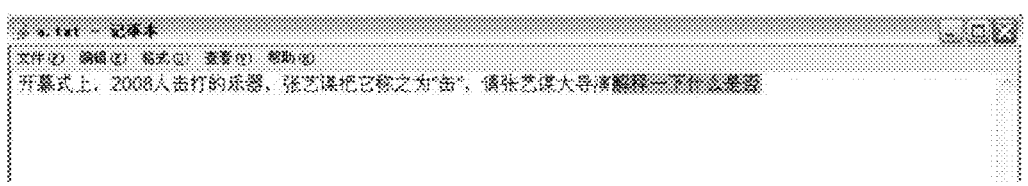
FIG. 13 illustrates a portion of an exemplary operation of the program to correct a long phrase in which the pinyin sequence is correct but the selection of the Chinese characters is incorrect as the user made the wrong selection of Chinese characters.

With reference to FIGS. 9-15, an exemplary operation of the program to correct a long phrase in which the pinyin sequence is correct but the selection of the Chinese characters is incorrect is illustrated. In this example, the user inputs the special key combination which causes the input window to appear over the editor window, as shown in FIG. 9, into which the user enters 'jsyixiasmshifou' as the pinyin sequence with its associated Chinese characters to be generated. FIGS. 10 and 11 indicate that the user presses 2 and 2 again to express his candidate Chinese character selections but, in fact, the second time he presses 2 was a mistake. The user then hits the enter key to place the phrase into the editor window, as shown in FIG. 12.

At this point, one IIO 300 is added to the list with following attribute values:

*keyboard_input='jsyixiasmshifou';
*phrase_select_input='22';
*output_str=the Chinese text associated with the input of '22'.

Here, the *phrase_select_input contains two characters with the second being incorrect. The user, therefore, wishes to correct the error and highlights the words to he corrected in the editor window and presses "Ctrl+F10," as shown in FIG.

Figure 14:
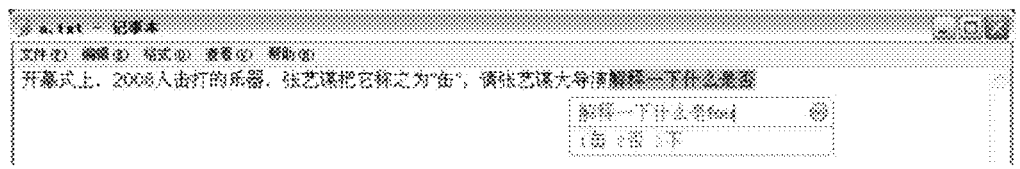
FIG. 14 illustrates a portion of an exemplary operation of the program to correct a long phrase in which the pinyin sequence is correct but the selection of the Chinese characters is incorrect where the original input pinyin sequence and the possible selections of Chinese characters are retrieved.
Figure 15:
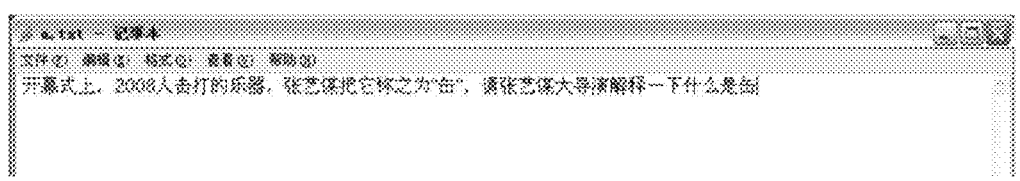
FIG. 15 illustrates a portion of an exemplary operation of the program to correct a long phrase in which the pinyin sequence is correct but the selection of the Chinese characters is correct as a result of a correct selection of Chinese characters by the user.

13. This action causes the input window to reappear, as shown in FIG. 14, whereby the user can change his choice to another candidate character and hit enter again. This will cause the input window to disappear and the editor window to show the newly selected candidate character and, hopefully, the correct text, as shown in FIG. 15.

Figure 16:
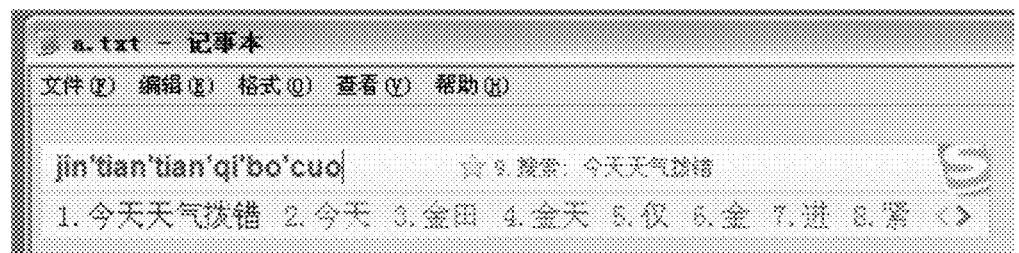
FIG. 16 illustrates a portion of an exemplary operation of the program to correct a phrase in which the pinyin sequence is incorrect and the possible mapped Chinese characters are incorrect as a result of the pinyin typo.

With reference to FIGS. 16-21, an exemplary operation of the program to correct the pinyin sequence and the selection of the Chinese characters is illustrated. In this example, both the pinyin sequence and the selection of the Chinese characters are incorrect. As shown in FIG. 16, the user inputted the pinyin sequence 'jintiantianqibocuo' for the associated Chinese text into the editor window by mistake. The correct pinyin sequence should have been 'jintiantianqibucuo' and the user mistyped the 'bu' with 'bo'.

Figure 17:
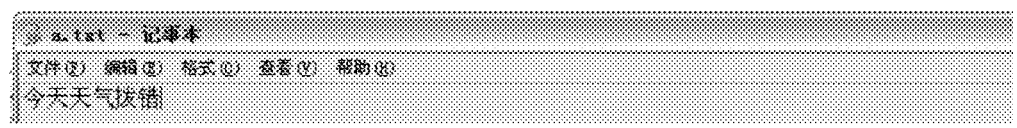
FIG. 17 illustrates a portion of an exemplary operation of the program to correct a phrase in which the pinyin sequence and the selection of the Chinese characters are both incorrect.
Figure 18:
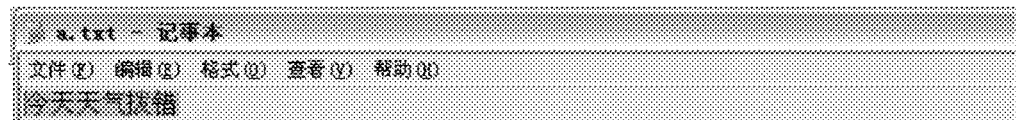
FIG. 18 illustrates a portion of an exemplary operation of the program to correct a phrase in which the pinyin sequence and the selection of the Chinese characters are both incorrect and the user highlights the Chinese characters that were just mapped for correction.
Figure 19:
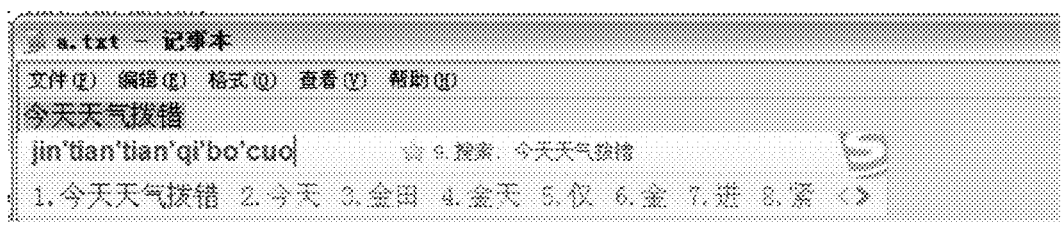
FIG. 19 illustrates a portion of an exemplary operation of the program to correct a phrase in which the pinyin sequence and the selection of the Chinese characters are both incorrect and the original input pinyin letters were retrieved.
Figure 20:
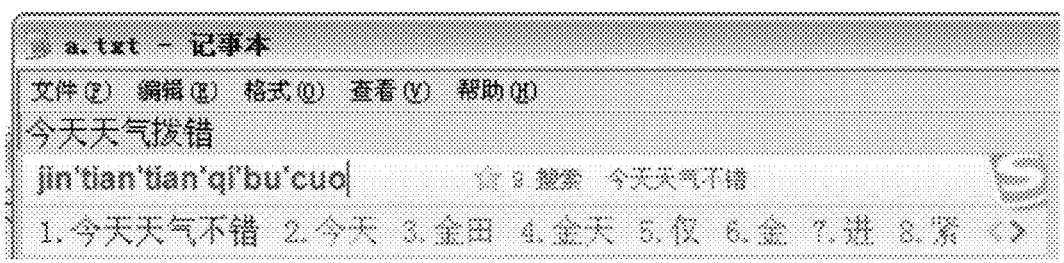
FIG. 20 illustrates a portion of an exemplary operation of the program to correct a phrase in which a portion of the input pinyin letters are corrected by the user (e.g., the user changes "bo" to "bu" in this example and the corresponding possible Chinese character selections are regenerated)
Figure 21:
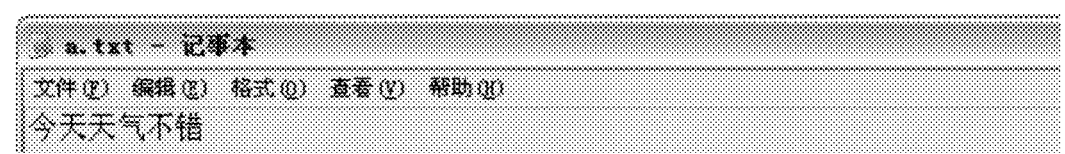
FIG. 21 illustrates a portion of an exemplary operation of the program to correct a phrase in which the pinyin sequence and the selection of the Chinese characters are both correct as a result of correction of the pinyin typo from FIG. 20.

The user selects candidate character choice #1 to choose the Chinese characters and the Chinese sentence with the incorrect wording goes into the editor window, as shown in FIG. 17. The user then finds the error and highlights the whole sentence, as shown in FIG. 18, and presses the predefined keyboard combination to activate the input window, as shown in FIG. 19. The user then corrects the incorrect pinyin sequence to 'jintiantianqibucuo' and selects candidate character choice #1, as shown in FIG. 20, and the whole sentence with the correct Chinese wording is placed in the editor window, as shown in FIG. 21.

In accordance with further aspects of the invention, it is to be understood that the editor window can be any word processing user interface by which a user is permitted to enter text into a document and is not limited to the above-described embodiments relating to pinyin sequences. That is, the invention can be used for various types of translations, such as the mapping of symbols to emoticons. In particular, the invention may be employed to correct a symbol sequence that is mapped to a certain incorrect emoticon instead of the user's intended emoticon. For example, if the user wants to indicate a smile, he may intend to input ":)" to generate "☺" but will instead input ":-*" to generate a kissing icon. In this case, the user could highlight the kissing icon in the editor window and press the predefined keyboard combination to activate the input window whereby the symbol sequence can be corrected.

Technical effects and benefits of the present invention include enabling retrieval of a keyboard pressed sequence of characters of a first type, permitting a re-selection of characters of a second type, which are associated with the keyboard pressed sequence of the characters of the first type and permitting modification of the keyboard pressed sequence of the characters of the first type to initiate a search for and retrieval of characters of the second type.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product comprising a non-transitory tangible storage medium readable by a processing circuit and on which instructions are stored for execution by the processing circuit for performing a method, the method comprising:
    enabling retrieval of a keyboard pressed sequence of characters of a first type;
    permitting a re-selection of characters of a second type, which are associated with the keyboard pressed sequence of the characters of the first type; and
    permitting modification of the keyboard pressed sequence of the characters of the first type to initiate a search for and retrieval of characters of the second type.

2. The computer program product according to claim 1, wherein the characters of the first type are pinyin characters and the characters of the second type are Chinese characters.

3. The computer program product according to claim 1, wherein the permitting of the re-selection of the characters of the second type comprises generating an input window in which the characters of the second type to be re-selected are listed.

4. The computer program product according to claim 3, wherein the input window provides for the modification of the keyboard pressed sequence of the characters of the first type.

5. A method for character correction for a program presenting an editor window displaying a sequence of characters of a first type, the method comprising:
    opening an input window of a computing device in response to a command with respect to a questionable character of the first type in the sequence;
    displaying in the input window:
    a character of a second type, which is associated with the questionable character and which is modifiable in the input window, and
    various selections for the user, each including characters of the first type, which are respective candidate characters for association with the character of the second type;
    updating the various selections in accordance with modifications made to the character of the second type in the input window; and
    upon a selection of one of the various selections or updates thereof, closing the input window and displaying the sequence of the characters of the first type in the editor window with the questionable character replaced by the candidate characters corresponding to the selection.

6. The method according to claim 5, wherein the characters of the first type comprise Chinese characters and the characters of the second type comprise characters in a pinyin sequence.

7. The method according to claim 5, wherein the command comprises:
    a highlighting of the questionable character in the editor window; and
    a pressing of a predefined keyboard combination.

8. The method according to claim 5, wherein an association of the character of the second type with the questionable character is determined in accordance with stored input information.

9. The method according to claim 5, wherein the characters of the first type, which are respective candidate characters, are generated in accordance with a translation and/or user history information.

10. The method according to claim 9, wherein the characters of the first type, which are respective candidate characters, are generated in accordance with a translation and/or user history information.

11. The method according to claim 10, wherein an association of the character of the second type with the questionable character is determined in accordance with stored input information.

12. A method for character correction for a program presenting an editor window displaying a sequence of characters of a first type, the method comprising:

opening an input window of a computing device in response to a command with respect to a questionable character of the first type in the sequence;

displaying in the input window:

a character of a second type, which is associated with the questionable character, and various selections for the user, each including characters of the first type, which are respective candidate characters for association with the character of the second type;

permitting the user to modify the character of the second type; and updating the various selections in accordance with modifications made to the character of the second type.

13. The method according to claim 12, further comprising closing the input window and displaying the sequence of the characters of the first type in the editor window with the questionable character replaced by the candidate characters corresponding to the selection, upon a selection of one of the various selections.

14. The method according to claim 12, wherein the characters of the first type comprise Chinese characters and the characters of the second type comprise characters in a pinyin sequence.

15. The method according to claim 12, wherein the command comprises:

a highlighting of the questionable character in the editor window; and a pressing of a predefined keyboard combination.

16. The method according to claim 12, wherein an association of the character of the second type with the questionable character is determined in accordance with stored input information.

17. A method for character correction for a program presenting an editor window displaying a sequence of characters of a first type, the method comprising:

opening an input window of a computing device in response to a command with respect to a questionable character of the first type in the sequence;

displaying in the input window:

a modifiable character of a second type, which is associated with the questionable character, and various selections for the user, each including characters of the first type, which are respective candidate characters for association with the modifiable character of the second type and each being updateable in accordance with modifications of the modifiable character of the second type; and upon a selection of one of the various selections, closing the input window and displaying the sequence of the characters of the first type in the editor window with the questionable character replaced by the candidate characters corresponding to the selection.

18. The method according to claim 17, wherein the characters of the first type comprise Chinese characters and the characters of the second type comprise characters in a pinyin sequence.

19. The method according to claim 17, wherein the command comprises:

a highlighting of the questionable character in the editor window; and a pressing of a predefined keyboard combination.

20. The method according to claim 17, wherein the characters of the first type, which are respective candidate characters, are generated in accordance with a translation and/or user history information.

\* \* \* \* \*